Figures 1, 2:
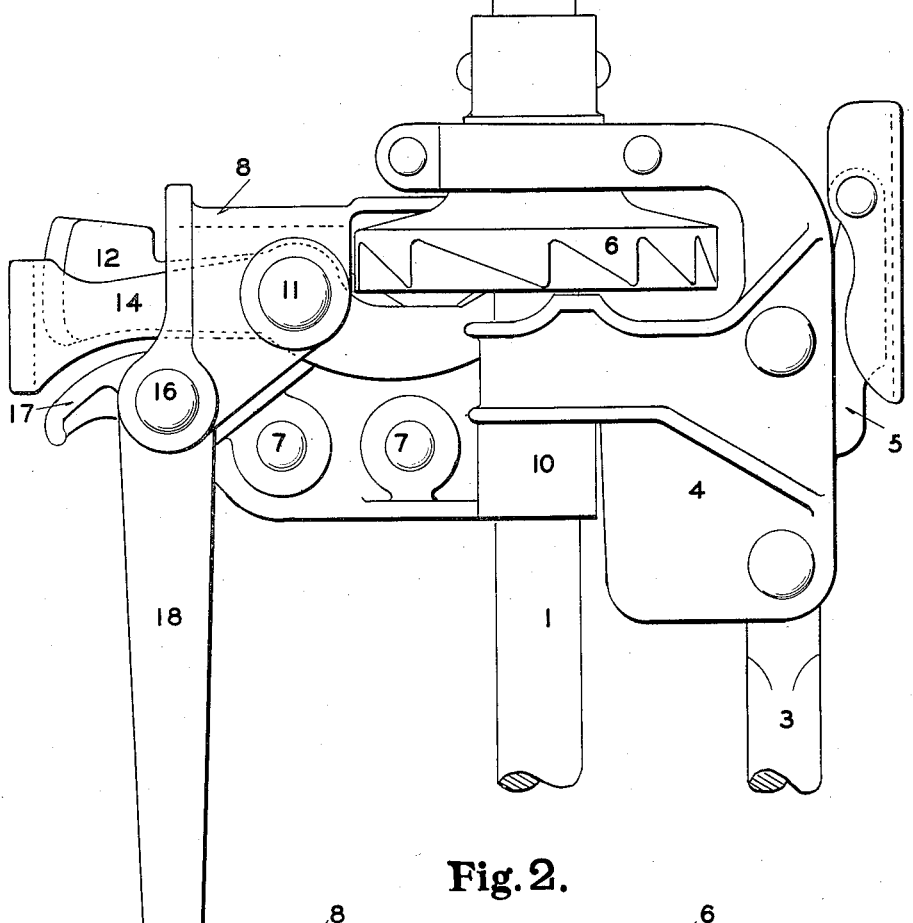

Nov. 14, 1933.　　　F. H. PIETZSCH　　　1,935,374
HAND BRAKE
Filed April 17, 1930　　3 Sheets-Sheet 1

Inventor
F. H. Pietzsch
By _[signature]_
Att'y.

Nov. 14, 1933.    F. H. PIETZSCH    1,935,374
HAND BRAKE
Filed April 17, 1930    3 Sheets-Sheet 2
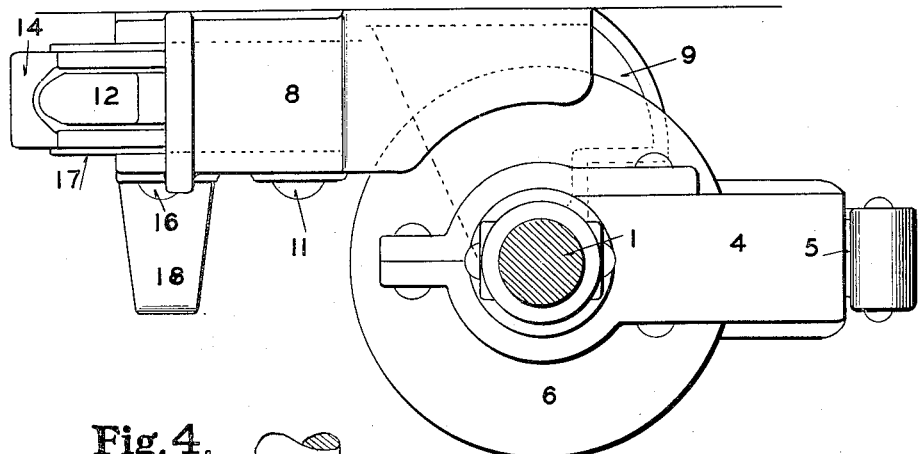
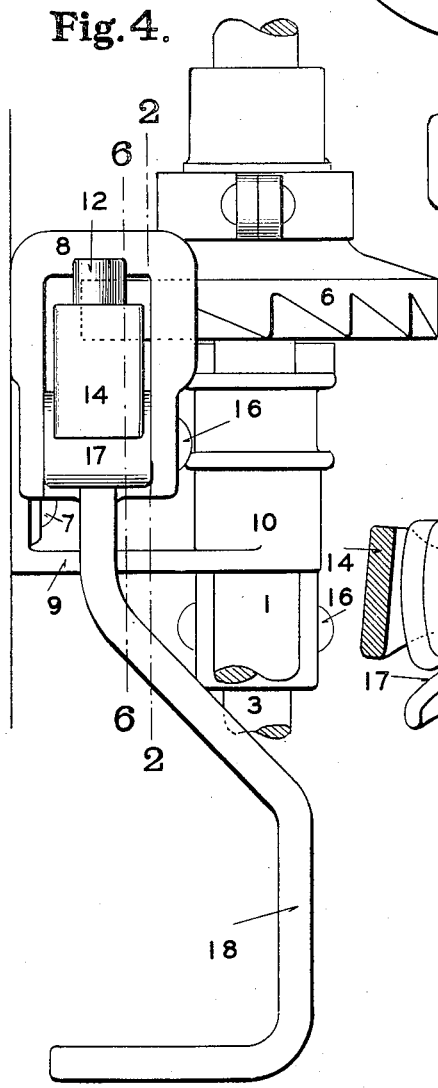
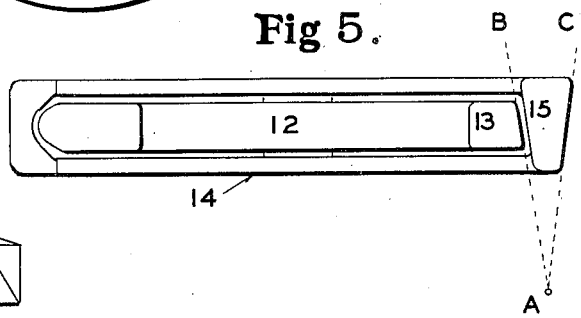
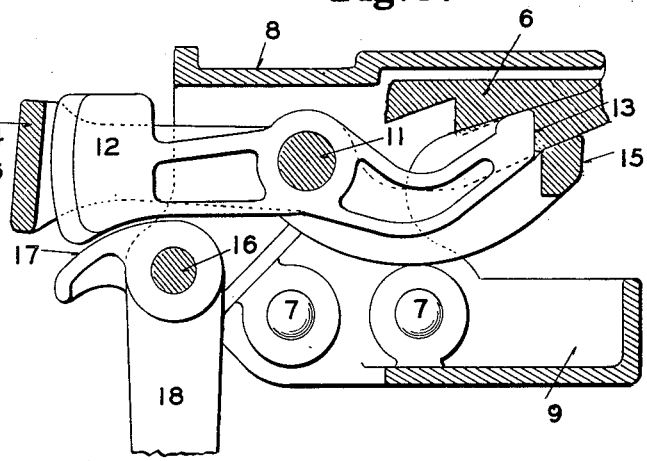
Inventor
F. H. Pietzsch
By E. E. Huffman
Att'y.

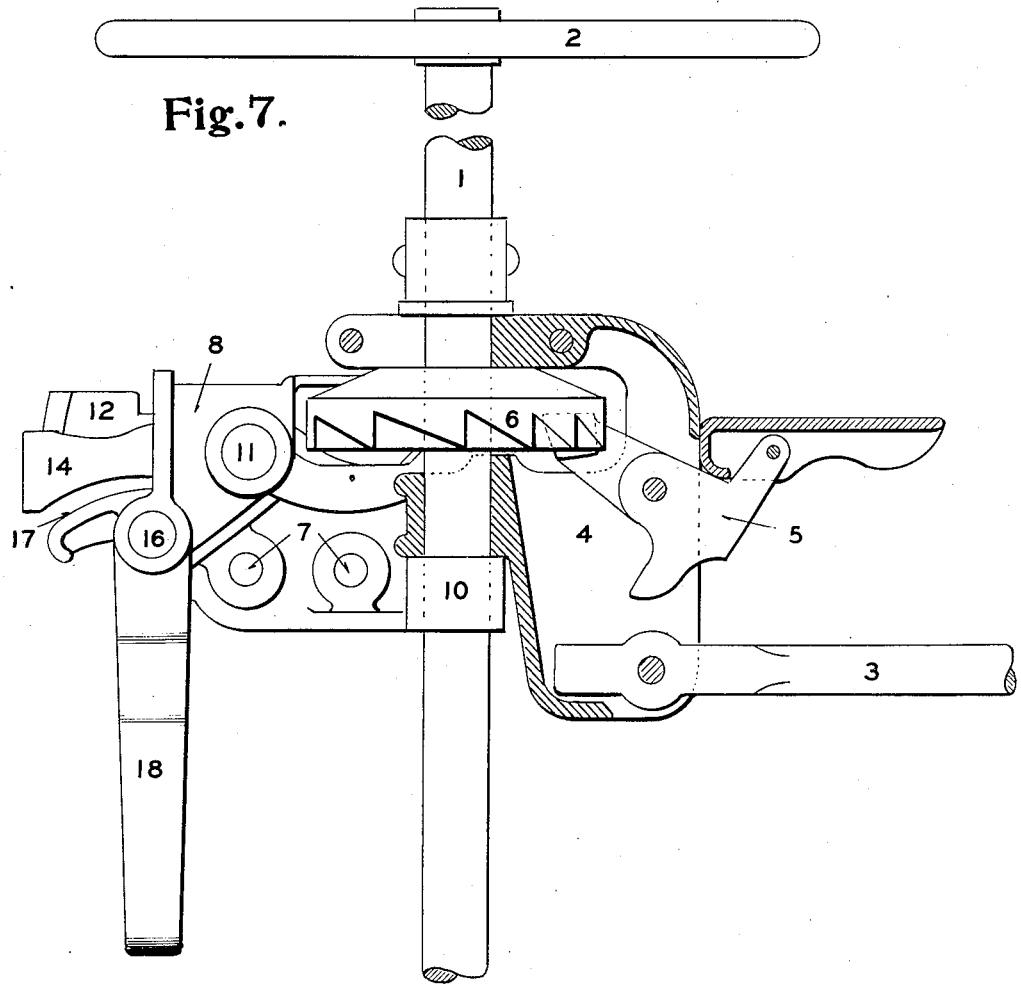

UNITED STATES PATENT OFFICE 1,935,374

HAND BRAKE

Frank H. Pietzsch, St. Louis, Mo., assignor to Railway Devices Company, St. Louis, Mo., a corporation of Missouri Application April 17, 1930. Serial No. 445,086

2 Claims. (Cl. 188—81.1)

My invention relates to a hand brake and particularly to the pawl mechanism for preventing the release movement of the brake staff. It is the object of my invention to provide a manually released pawl mechanism in lieu of the usual foot pawl and further, to so construct the pawl mechanism as to provide fine adjustment without increasing the number of teeth on the ratchet wheel.

In the accompanying drawings, which illustrate one form of hand brake made in accordance with my invention, Figure 1 is a front elevation; Figure 2 is a section taken on the line 2—2 of Figure 4; Figure 3 is a top plan view; Figure 4 is a side elevation; Figure 5 is a top plan view of the double pawl; Figure 6 is a section taken on the line 6—6 of Figure 4, and Figure 7 is a front elevation with part of the housing broken away to show the engagement of the dog with the ratchet wheel.

In the drawings I have shown my invention as applied to a brake of the type shown and described in Patent No. 1,491,378 granted April 22, 1924 to Sterling H. Campbell. The brake staff 1 may be provided with a hand wheel 2 but is usually actuated by a handle 3 pivoted to a housing 4 loosely mounted on the brake staff and carrying a dog 5 for engagement with a ratchet wheel 6 rigidly secured to the brake staff. These parts are like those shown in the Campbell patent above referred to and need not be described in detail.

Secured to the end of the car by bolts or rivets 7 is an inverted U-shaped pocket 8 having on its lower edge an outwardly projecting flange 9 carrying a bearing 10 for the brake staff. Extending through the bracket is a pivot pin 11 on which is mounted a duplex pawl consisting of a part 12 provided with a contact face 13 and a slotted part 14 enclosing the part 12 and provided with a contact face 15. These faces 13 and 15 lie in planes indicated by dotted lines A—B and A—C respectively, (Figure 5) which planes are radial with respect to the axis of the brake staff, indicated by A, and are separated by an angular distance equal to approximately one-half the angular distance between two successive teeth of the ratchet wheel. Due to this construction and arrangement of the duplex pawl the face 13 will engage with one of the teeth on the ratchet wheel, as shown in Figure 6, when the wheel is in one position. When the wheel is rotated through an angular distance equal to one-half that between two successive teeth of the wheel the tooth formerly engaged by the face 13 will be engaged by the face 15, as shown in Figure 2. It will be seen that I secure a brake adjustment as fine as could be secured by the use of a ratchet wheel having twice as many teeth cooperating with a single pawl; which latter arrangement could not be secured without either increasing the diameter of the ratchet wheel beyond the limits imposed by the brake construction or reducing the size of the teeth to such an extent that their strength would be inadequate to withstand the strains due to the manipulations of the brake.

Pivoted in the bracket 8 below the pawl by a pin 16 is a cam 17 of sufficient width to contact with the lower edges of both the parts 12 and 14. The cam is provided with a handle 18 by movement of which, upwardly and toward the left hand side (Figure 1), the cam is carried to contact with both members of the pawl to withdraw the contact faces 13 and 15 out of the path of the ratchet teeth to permit the release of the brake.

Owing to the fact that the contact faces of the duplex pawl are held in operative position by the action of gravity on the heavy outer ends of the parts 12 and 14, the use of springs in the construction is obviated. Further, the position of the pawl releasing handle 18 is such that it is always within reach of the brakeman whether he is applying the brake by means of the wheel 2 or the handle 3.

Having fully described my invention, what I claim as new and desire to secure by Letters Patent of the United States is:

1. In a device of the class described, the combination with a vertical brake staff, of a wheel non-rotatably mounted thereon, a member mounted on said staff adjacent said wheel to have oscillatory movement relative thereto and engaging with the wheel to rotate the staff, a housing mounted adjacent the staff, a horizontal pivot carried by said housing, a slotted pawl mounted on said pivot, a second pawl mounted on said pivot and positioned in the slot of said first named pawl, the inner ends of said pawls lying in converging planes and engaging with teeth in the lower face of the wheel, the outer ends of the pawls being counterbalanced to actuate the pawls by gravity, and a pendulous pivoted handle provided on its upper end with a cam for contacting the pawls to release them from engagement with the wheel.

2. In a device of the class described, the combination with a brake staff, of a wheel non-rotatably mounted thereon, a member mounted on said staff adjacent said wheel to have oscillatory movement relative thereto and engaging with the wheel to rotate the staff, a housing mounted adjacent the staff, a pivot carried by said housing approximately at right angles to the staff, a slotted pawl mounted on said pivot, a second pawl mounted on said pivot and positioned in the slot of the first named pawl, the inner ends of said pawls lying in converging planes and engaging teeth on a face of the wheel, the outer ends of the pawls being counter-balanced to actuate the pawls by gravity, and a pivoted handle provided on one end with a cam for contacting the pawls to release them from engagement with the wheel.

FRANK H. PIETZSCH.